Nov. 17, 1953     H. P. GEORGII ET AL     2,659,123
APPARATUS FOR MAKING CONCRETE ELEMENTS
Filed Nov. 16, 1949     6 Sheets-Sheet 1
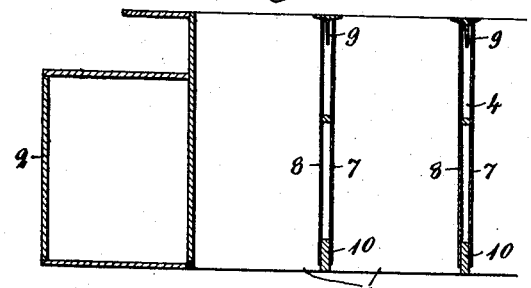
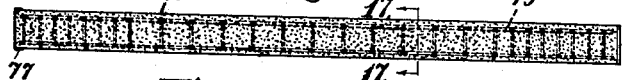
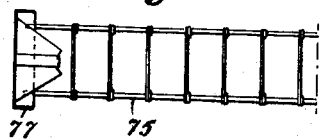
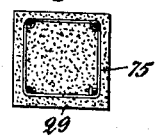

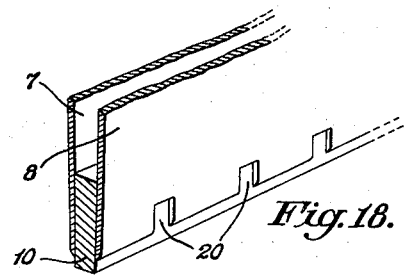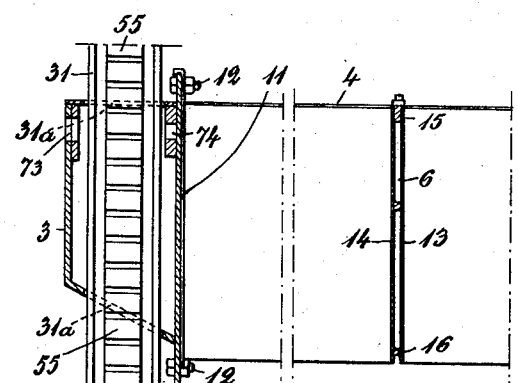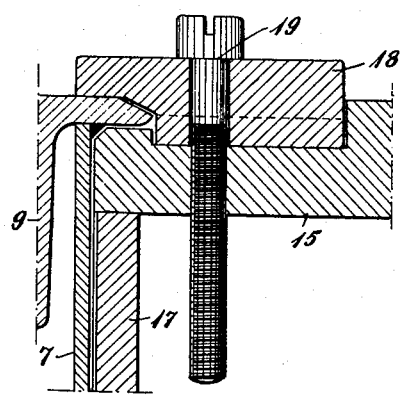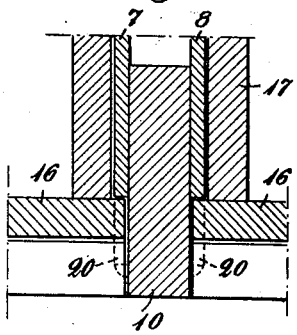

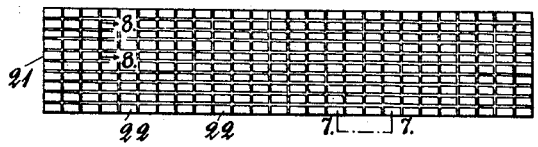
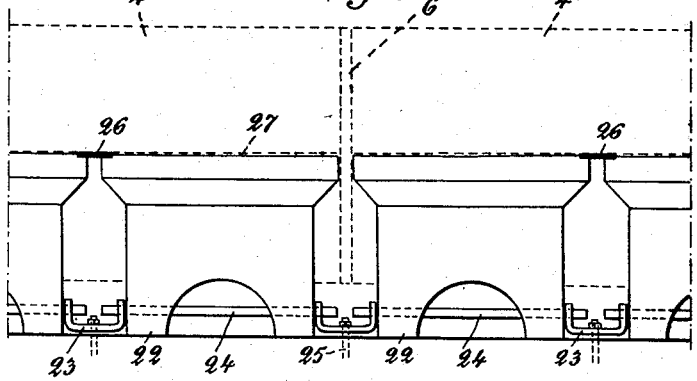
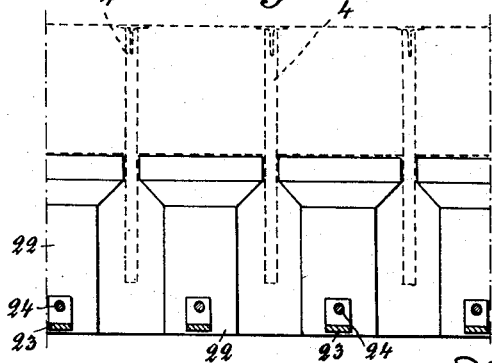

Nov. 17, 1953     H. P. GEORGII ET AL     2,659,123
APPARATUS FOR MAKING CONCRETE ELEMENTS
Filed Nov. 16, 1949     6 Sheets-Sheet 4
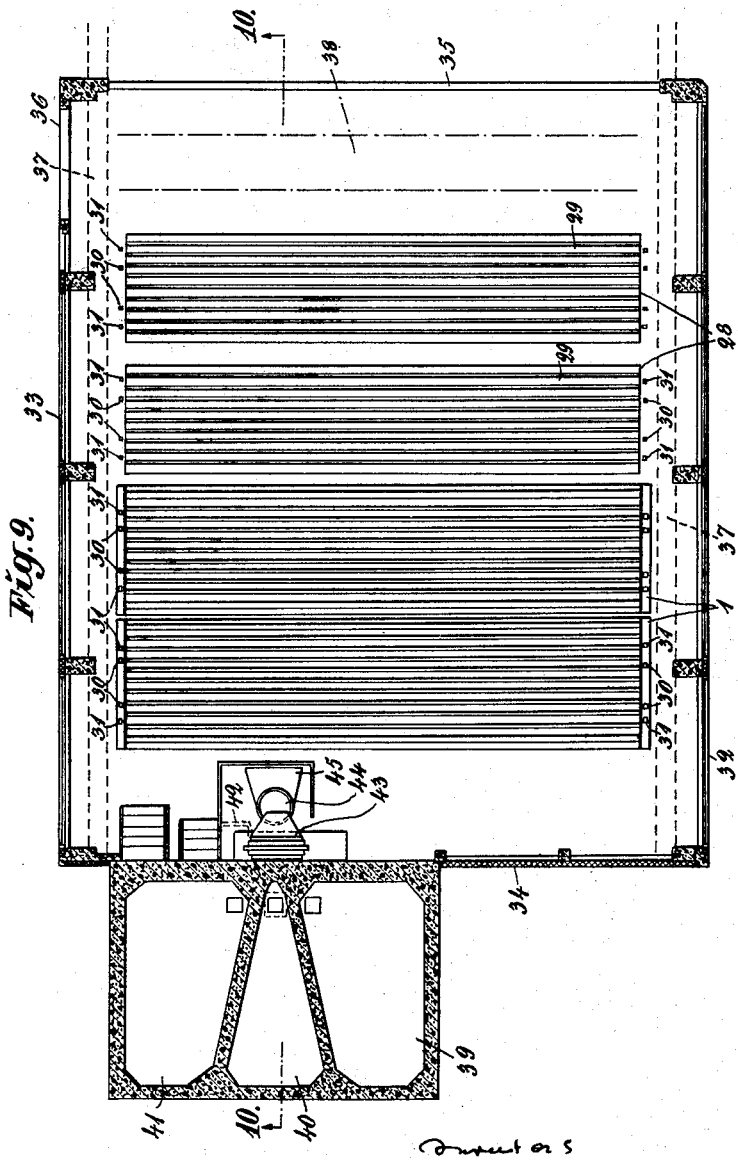

Nov. 17, 1953  H. P. GEORGII ET AL  2,659,123
APPARATUS FOR MAKING CONCRETE ELEMENTS
Filed Nov. 16, 1949  6 Sheets-Sheet 5
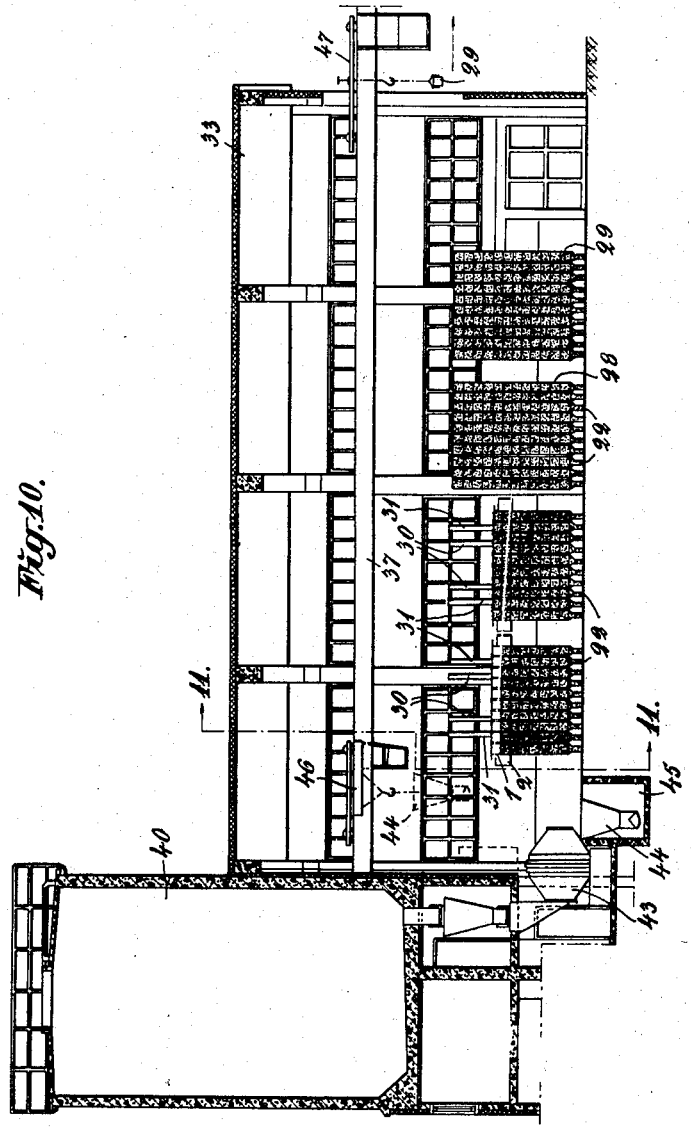

Nov. 17, 1953   H. P. GEORGII ET AL   2,659,123
APPARATUS FOR MAKING CONCRETE ELEMENTS
Filed Nov. 16, 1949   6 Sheets-Sheet 6
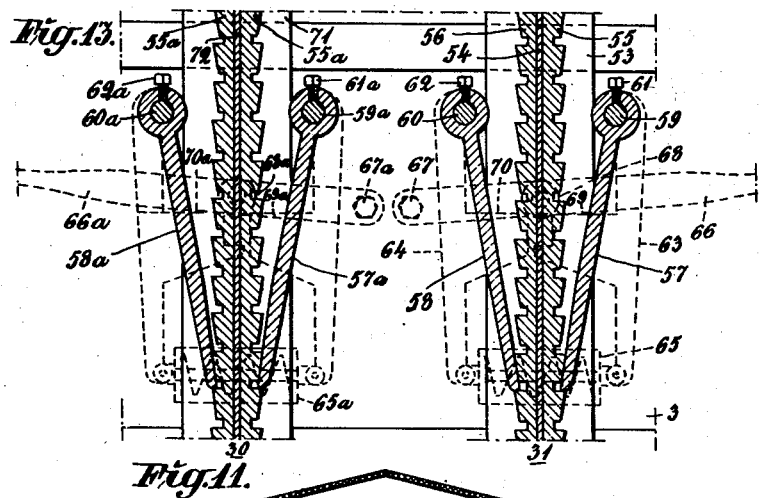
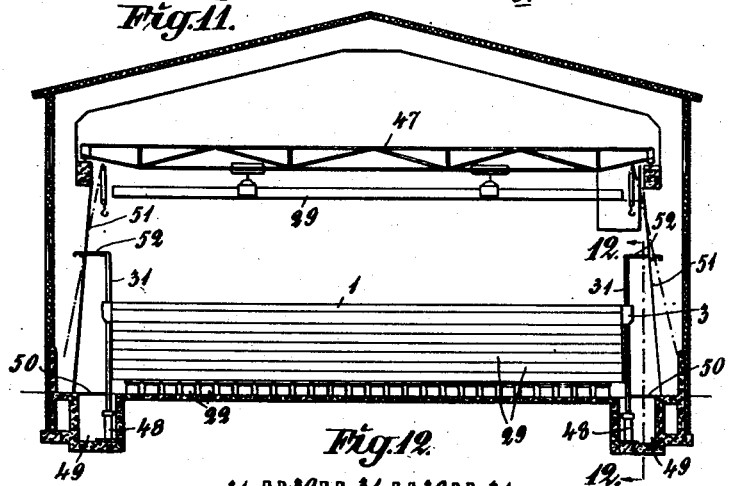
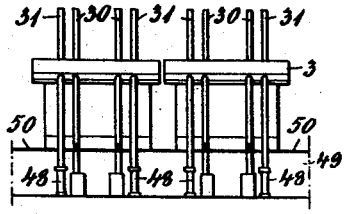

Patented Nov. 17, 1953

2,659,123

UNITED STATES PATENT OFFICE 2,659,123

APPARATUS FOR MAKING CONCRETE ELEMENTS

Hans Peter Georgii, Stockholm, and Nils Oscar Helge Engström, Bromma, Stockholm, Sweden, assignors to Aktiebolaget Skanska Cementgjuteriet, Stockholm, Sweden, a company under the laws of Sweden Application November 16, 1949, Serial No. 127,722

2 Claims. (Cl. 25—119)

The present invention relates to an arrangement by means of which the manufacture of concrete elements is considerably simplified so that they can be produced on a large scale in practically any required lengths, thus rendering possible factory production in place of production on the working site which was the method employed almost exclusively hitherto and was accompanied by difficulties and loss of time.

According to the invention the concrete elements are cast in forms by means of a number of partition walls divided into a number of compartments having the intended width of the concrete elements to be produced, said compartments being so constructed that with the help of transverse, preferably removably and displaceably arranged cross shutterings they may be divided into lengths corresponding to the desired element lengths. The depth of the form is preferably greater than the corresponding dimension of the elements so that the form is adapted to serve as a sliding form when carrying out the casting operation. After completing the casting of a set of elements and after adequate solidification of the concrete in said elements, the form is raised a distance corresponding to the thickness of the elements, whereupon the casting of a new set of elements takes place, an intermediate layer being inserted which prevents the newly cast material from adhering to the elements already cast. Thus, the casting form is always guided by the most recently cast elements lying above and adjacent to one another.

The casting is preferably carried out on a special casting bed consisting of a number of supports corresponding to the compartments of the casting form. Preferably said supports consist of a number of plinths arranged with intermediate spaces for inserting the partition walls and the cross shutterings between the plinths, the height of the casting bed (plinths) being sufficient to allow the lowering of the form with its respective partitions and cross shutterings to a depth equal to the total depth of the form reduced by the approximate thickness desired for the elements it is intended to cast.

In order to enable the cast elements to come loose more easily from the form, the compartments of the form are preferably made slightly conical, tapering upwards, which can be effected in different ways, for example, by mounting special plates on the partition walls and/or the cross shutterings.

For raising the form in accordance with the progressive casting of the respective sets of piles or posts located above one another, lifting jacks, hydraulic or other suitable lifting devices known per se may be employed, care being taken that the raising of the form takes places as uniformly as possible and on all sides at the same speed. Cranes and similar equipment may of course also be used for this purpose. To enable the concrete elements, e. g. piles, to harden sufficiently before they are transported away from the respective supports on which they lie stacked above one another, a number of casting beds may be arranged adjacent to one another so that after completing the casting of one stack of piles on one casting bed casting can be continued on the nearest adjoining one. It has been found, for example, that when using two forms each having 10 compartments, and carrying out the casting with each form alternately, for a stack comprising 10 sets of piles located above one another on the respective beds, four beds arranged in series are sufficient to enable the piles from the first bed to be removed after completing the casting of the last set on the last bed, the removal preferably being effected with the help of cranes or traversers.

On casting the concrete is preferably supplied from a common concrete feeder which moves backwards and forwards over the form on a traverser in the longitudinal direction of the form, and which in turn receives the concrete from a concrete mixer with a preferably automatically regulated supply of cement, gravel, course gravel and water which may be suitably fed down from silos located above the concrete mixer.

Before placing the concrete the partition walls and the casting bed should be oiled as known per se, and/or covered with cardboard or paper or similar material which is also employed as an intermediate layer between the respective layers of piles. The reinforcements, when used, are preferably assembled to form so-called pretied reinforcing cages which are then placed upon a support of small blocks of concrete in the respective compartments before placing the concrete.

The accompanying drawings illustrate by way of example a suitable embodiment of the casting arrangement according to the invention, especially in connection with the casting of piles as a non-limitative example.

In the drawings:

Fig. 1 shows the casting form according to the invention, viewed from above.

Fig. 2 is an enlarged transverse sectional view taken along the line 2—2 of Fig. 1.

Fig. 3 is an enlarged longitudinal sectional view taken along the line 3—3 of Fig. 1.

Figs. 4 and 5 are sectional views of details showing the means of securing the cross shutterings to the partition walls.

Fig. 6 shows the casting bed, viewed from above.

Fig. 7 shows, on a larger scale, a part of the casting bed seen from the line 7—7 of Fig. 6 with the casting form indicated above the casting bed.

Fig. 8 is an enlarged view of the casting bed seen from the line 8—8 of Fig. 6 with the casting form indicated above the casting bed.

Fig. 9 is a view from the casting plant showing the arrangement of the casting forms and stacks of piles in the casting house as well as the concrete mixer and a section through the silos for concrete raw material.

Fig. 10 is a longitudinal sectional view taken along the line 10—10 of Fig. 9.

Fig. 11 is a transverse sectional view taken along the line 11—11 of Fig. 10.

Fig. 12 is a view of the lifting and supporting arrangements for the form seen from the line 12—12 in Fig. 11.

Fig. 13 is a sectional view illustrating, on a larger scale, the transmission of force in the lifting operation by means of tracks and catches.

Fig. 14 is a view of a pre-tied reinforcing cage placed on small concrete blocks.

Fig. 15 is a longitudinal sectional view through a reinforced concrete pile.

Fig. 16 is a view showing the arrangement of the reinforcements and the pile shoe before the placing of concrete in the form compartment.

Fig. 17 is an enlarged cross sectional view taken along the line 17—17 of Fig. 15.

Fig. 18 is a partly sectional, fragmentary view of a part of the mold of the present invention.

Referring to the drawings, 1 is the casting form, the outer walls of which consist of a frame assembled of two longitudinal beams 2 and two cross beams 3, said beams being made of, for example, steel plates welded together. By means of partition walls 4 the form 1 is divided into a number of longitudinal compartments 5, cross shutterings 6 being inserted into some of said compartments indicating the means of dividing the compartments into lengths, corresponding to the desired lengths of the concrete elements to be cast.

The partition walls 4 are preferably made of two steel plates 7 and 8, at their upper ends welded to a T-iron 9 and at their lower ends to a flat iron 10 in such a way that they are slightly tapered downwards in order to facilitate the releasing of the form, when raising the latter, from the cast pile material (Figs. 10 and 18). The depth of the form according to the construction shown in the drawing is approximately double the depth of the corresponding dimension of the piles to be cast in the forms. As shown in Fig. 3, the end of the partition wall 4 is suspended on the cross beam 3 by means of a flat iron 11 bent at its upper end and secured to the beam by means of bolts 12.

The cross shutterings 6 are also preferably made of steel plates 13 and 14 welded to a frame of flat iron 15, 16 and 17 (Figs. 3–5). Fig. 4 illustrates the manner of securing the cross shutterings 6 to the upper part of the partition wall by means of a locking washer 18 and the bolt 19. Fig. 5 shows the means for securing the cross shuttering to the lower part of the partition wall 4. For this purpose each of the plates 7 and 8 is provided with a recess 20 adapted to serve as a support for the flat iron 16.

The casting bed 21 comprises a number of plinths 22 arranged in rows beside one another, so that a bed is formed which consists of the same number of rows of longitudinal plinths as the number of compartments in the sliding form. These rows are located at such a distance from one another that the partition walls 4 of the form can be lowered into the intermediate spaces, as shown in Fig. 8. In the transverse direction the rows of plinths are similarly divided into a relatively large number of transverse rows with corresponding intermediate spaces intended for the reception of the cross shutterings 6, as shown in Fig. 7, which are displaceably arranged in the respective compartments for the division of the latter in the longitudinal direction, corresponding to a desired pile length.

The plinths 22 are secured in position by means of bent flat irons 23 placed below between the plinths and iron bars 24 passing through the lower part of said plinths and rigidly connected with the irons 23, said irons being secured to the floor below on which the casting bed is located by means of bolts 25 cast into the floor.

If the length of the pile to be cast corresponds to the length of several plinths, a sufficient number of covering plates 26 are placed over the transverse spaces between the plinths of the casting bed, as shown in Fig. 7, where 27 indicates cardboard placed on the plinths before casting the first set of concrete piles in the form.

As shown in Figs. 9 and 10, a row of four casting beds is arranged side by side in a casting house, casting being alternately carried out in the form 1 on the two beds to the left, while stacks 28 of cast piles 29 are shown on the two beds to the right. 30 are columns for supporting the forms 1 and 31 columns for lifting the forms according to the casting proceeds, holes 30a and 31a for said columns in the cross beams 3 being indicated in Figs. 1 and 3. The walls of the casting house are indicated by 32, 33 and 34, and on the fourth side is an opening 35 for a transverser 47 running on a track 37. In the wall 33 is an opening 36 intended for a truck (not shown) running on a track 38. By means of said truck pre-tied reinforcing cages 75 (Fig. 14) are transported into the casting house and are suitably placed in stacks (omitted in the drawing for simplifying the showing) behind the casting beds, so that the transverser 47 may be employed as a common transverser for transporting both the sliding form from a casting bed to another and the reinforcing cages as well as the cast and hardened piles 29 from the pile stacks 28 out to the casting house.

Silos 39, 40 and 41 are provided for cement, sand and coarse gravel and/or macadam, respectively, and 42 is a water pipe, 43 a concrete mixer, 44 a concrete container and 45 a shaft in the floor for the concrete basker. The supply of the respective materials from the silos to the concrete mixer is preferably regulated automatically from a common control station (not indicated). A transverser 46 serves for moving the concrete container 44 forwards and backwards on the track 37 over the casting form when carrying out the casting.

The arrangements for lifting the forms 1 are shown in Figs. 11 to 14. For each form are provided four hydraulic lifting jacks 48 (two for each cross beam 3) arranged in trenches 49 in the floor provided with door plates 50. The lifting force is transmitted from the lifting jacks 48 to the cross beams 3 by means of the lifting columns 31 consisting of H-beams 53, and two racks 55 and 56 attached to the web 54 of the H-beam and two catches 57 and 58, respectively, secured to shafts 59 and 60, respectively, by means of adjusting bolts 61 and 62, said shafts being supported in bearings 73 and 74 in the cross beams 3. The catches 57 and 58 are pressed against the racks 55 and 56 by means of levers 63 and 64 and the spring 65 located on the outside of the cross beam 3.

By means of the lever arm 66 located on the outside of the cross beam 3 and pivotally supported by the shaft 67 the catches 57 and 58 may be released from the racks 55 and 56 when the roller 68 connected to the lever arm 66 is lowered between the projections 69 and 70 on the levers 63 and 64.

When the lifting columns 31 are raised by aid of the lifting jacks 48, the catches 57 and 58 are engaged with the racks 55 and 56 and consequently also the cross beams 3 and the form 1 are raised. When the lifting jacks are disengaged, the lifting columns are lowered and this movement is not hindered by the catches although the cross beams 3 do not move.

For supporting the form 1 are provided four supporting columns 30 (two for each cross beam 3) consisting of H-beams 71 with the web 72. Said supporting beams stand on the floor and the transmission of force between the cross beams 3 and the supporting beams 30 is effected by means of arrangements 55a to 70a of exactly the same construction and the same function as in case of the arrangements 55 to 70 for the lifting columns 31.

When the form 1 is raised, the catches 57a and 58a slide upwards and this movement is not hindered by the racks 55a and 56a, respectively.

For guiding the upper part of the lifting columns 31 said columns are provided with side supports 52 attached to the wall columns 51 of the casting house, as shown in Fig. 11. Similar side supports are also provided for the supporting columns 30 (not shown).

The lifting jacks are fed by means of an electrically driven pump (not shown). The piston stroke of the lifting jacks 48 is adjustable and regulated in such a way that the length of the stroke is equal to the thickness of the concrete elements, whereby it is possible to raise the form exactly to the desired height without performing an especial measurement of the lifting height. Further, the lifting jacks are suitably arranged to work synchronously so that the raising of the form takes place uniformly on all sides.

The casting of concrete elements with the use of the described apparatus and arrangement may be carried out as follows.

Before casting commences, the sliding form is lowered over the casting form 21 with its partition walls 4 and cross shutterings 6 in position, as shown in Figs. 7 and 8. Both the form and the plinths are oiled or covered with cardboard 27 or similar material which prevents the concrete from adhering to the respective parts. Pile shoes 77 and reinforcing irons, when used, are inserted into the compartments of the form and placed in position, the latter preferably in the form of pre-tied reinforcing cages 75 supported at a suitable height by means of small concrete blocks 76, as shown in Figs. 14 and 16.

The casting of a set of concrete piles is then carried out simultaneously by filling the compartments with concrete fed from the concrete container 44 which is moved forwards and backwards over the form 1 by means of a transverser 46, as already described. Hereupon the concrete in the set of piles thus cast must solidify to such an extent that the sliding form can be raised for casting a new set of piles above the recently completed set which latter now serves as a guide. The raising of the form is effected by the means and in the manner already described above. Before continuing casting, an intermediate layer of suitable material, such as cardboard or paper, is placed in position to prevent adhesion between the concrete newly placed and the set of concrete piles already cast. The casting is then carried on in the manner described.

In this casting process, during the casting of the first set of piles the casting form is guided by the casting bed itself, and in the latter steps of casting by the set of elements most recently cast.

When a suitable number of sets of piles, 10 for example, have been cast, the sliding form is moved over to another casting bed by means of the transverser 47, whereupon casting proceeds on the latter casting bed as described. When the casting of all four stacks has been completed, the stack which has been cast first is removed and further casting is then carried out on the bed which has thus become vacant.

A reinforced concrete pile made according to the present invention is shown in Figs. 15 and 17.

Although the invention in the abovementioned example has been described in connection with alternate casting on four casting beds, it is by no means limited hereto, and the casting may obviously also be carried out with the use of a single casting bed or a different number of beds. Also in other respects such modifications in the arrangements shown and the construction of the apparatus may be made as lie within the scope of the invention.

We claim:

1. Apparatus for casting concrete comprising, in combination, a form having a plurality of longitudinal walls rigidly connected at their respective ends to a pair of cross members and arranged adjacent to each other so as to provide a plurality of spaces between said walls, said longitudinal walls each comprising a pair of spaced metal plate members welded at their upper edges to a T-bar, with the top part of the T-bar extending laterally beyond the plate members at their upper edges, and at their lower edges to an elongated spacer member located therebetween, the said plate members being spaced apart at their upper edges by a distance which is slightly greater than the distance by which they are spaced apart at their lower edges so as to provide a taper in the wall which facilitates removal from the concrete cast against it, and a plurality of transverse walls mounted respectively in the spaces between said longitudinal walls and being rigidly connected to said longitudinal walls, said transverse walls each comprising a pair of spaced, metal plate members welded at their upper and lower edges to spacer bars located therebetween and being spaced at their upper edges by a distance which is slightly greater than the distance by which their lower edges are spaced so as to provide a taper permitting easy removal from the concrete, whereby said form provides a single unitary structure adapted to be lifted as one piece from concrete cast in the spaces defined by said longitudinal and transverse walls and said cross members; and clamping means located adjacent the upper ends of the transverse walls for rigidly connecting said transverse walls to portions of the T-bar which extend beyond the plate members of the longitudinal walls.

2. Apparatus for casting concrete comprising, in combination, a form having a plurality of longitudinal walls rigidly connected at their respective ends to a pair of cross members and arranged adjacent to each other so as to provide a plurality of spaces between said walls, said longitudinal walls each comprising a pair of spaced metal plate members welded at their upper edges to a T-bar, with the top part of the T-bar extending laterally beyond the plate members at their upper edges, and at their lower edges to an elongated spacer member located therebetween, the said plate members being spaced apart at their upper edges by a distance which is slightly greater than the distance by which they are spaced apart at their lower edges so as to provide a taper in the wall which facilitates removal from the concrete cast against it, said plate members of said longitudinal walls being formed with openings adjacent their lower edges, and a plurality of transverse walls mounted respectively in the spaces between said longitudinal walls and being rigidly connected to said longitudinal walls, said transverse walls each comprising a pair of spaced, metal plate members welded at their upper and lower edges to spacer bars located therebetween and being spaced at their upper edges by a distance which is slightly greater than the distance by which their lower edges are spaced so as to provide a taper permitting easy removal from the concrete, the spacer bar adjacent the lower edges of said plate members of the transverse wall having end portions extending slightly beyond the side edges of the transverse wall and being located in said openings in the plate members of said longitudinal walls, whereby said form provides a single unitary structure adapted to be lifted as one piece from concrete cast in the spaces defined by said longitudinal and transverse walls and said cross members; and clamping means located adjacent the upper ends of the transverse walls for rigidly connecting said transverse walls to portions of the T-bar which extend beyond the plate members of the longitudinal walls.

HANS PETER GEORGII.
NILS OSCAR HELGE ENGSTRÖM

References Cited in the file of this patent

UNITED STATES PATENTS

| Number | Name | Date |
| --- | --- | --- |
| 733,396 | Jarvis | July 14, 1903 |
| 818,452 | Judie | Apr. 24, 1906 |
| 1,554,586 | Lake | Sept. 22, 1925 |
| 1,655,725 | Crozier | Jan. 10, 1928 |
| 1,920,716 | Schafer | Aug. 1, 1933 |
| 2,006,594 | Hoch | July 2, 1935 |
| 2,131,474 | Henderson | Sept. 27, 1938 |
| 2,368,502 | Troiel | Jan. 30, 1945 |

OTHER REFERENCES

Webster's International Dictionary, second edition, 1938, G. & C. Merriam Co., Boston, Mass., page 780.